(12) United States Patent
Inaba et al.

(10) Patent No.: US 8,968,879 B2
(45) Date of Patent: Mar. 3, 2015

(54) PACKAGING MATERIAL FOR BLOOD BAG AND BLOOD BAG PACKAGING

(71) Applicant: Terumo Kabushiki Kaisha, Tokyo (JP)

(72) Inventors: Takuya Inaba, Koga (JP); Takayoshi Yao, Fujinomiya (JP)

(73) Assignee: Terumo Kabushiki Kaisha, Shibuya-Ku, Tokyo (JP)

( * ) Notice: Subject to any disclaimer, the term of this patent is extended or adjusted under 35 U.S.C. 154(b) by 0 days.

(21) Appl. No.: 14/013,658

(22) Filed: Aug. 29, 2013

(65) Prior Publication Data

US 2014/0004284 A1 Jan. 2, 2014

Related U.S. Application Data

(63) Continuation of application No. PCT/JP2012/055268, filed on Mar. 1, 2012.

(30) Foreign Application Priority Data

Mar. 1, 2011 (JP) .................................. 2011-044300

(51) Int. Cl.
*B32B 15/04* (2006.01)
*B32B 19/00* (2006.01)
(Continued)

(52) U.S. Cl.
CPC . *A61J 1/10* (2013.01); *B32B 27/08* (2013.01); *B32B 27/281* (2013.01); *B32B 27/36* (2013.01);
(Continued)

(58) Field of Classification Search
CPC ........ B32B 27/08; B32B 27/30; B32B 27/34; B32B 27/306; B32B 27/308; B32B 1/02; B32B 2307/31; B32B 2307/518; B32B 2439/46; B32B 2439/80; B32B 2255/20; B32B 2255/205; B65D 75/26; B65D 77/2024; A61J 1/05; A61J 1/10
USPC ........... 428/35.2, 35.3, 35.4, 35.7, 35.8, 35.9, 428/36.6, 36.7, 457, 461, 469, 470, 500, 428/688, 689
See application file for complete search history.

(56) References Cited

FOREIGN PATENT DOCUMENTS

| JP | 06-319785 A | 11/1994 |
|----|-------------|---------|
| JP | 8-243148 A | 9/1996 |

(Continued)

OTHER PUBLICATIONS

International Search Report (PCT/ISA/210) issued on Jun. 5, 2012, by the Japanese Patent Office as the International Searching Authority for International Application No. PCT/JP2012/055268.
(Continued)

*Primary Examiner* — Walter B Aughenbaugh
(74) *Attorney, Agent, or Firm* — Buchanan, Ingersoll & Rooney PC

(57) ABSTRACT

A packaging material for blood bags includes two laminate films (I), wherein each laminate film (I) includes a base layer (Y), an inorganic deposited layer (X) formed on top of the base layer, a layer ($Z_1$) containing a polymer of an unsaturated carboxylic acid compound polyvalent metal salt formed on top of the inorganic deposited layer (X), and a layer ($Z_2$) containing a polymer of an unsaturated carboxylic acid compound polyvalent metal salt and a vinyl alcohol based polymer formed on top of the layer ($Z_1$), laminating the two laminate films (I) with the layers ($Z_2$) being laminated to form a laminate film (II), and laminating a heat seal layer on top of at least either one of the base layers (Y) of the laminate film (II). The packaging material can exhibit relatively high water vapor permeation resistance and excellent transparency and stability.

10 Claims, 3 Drawing Sheets

(51) Int. Cl.
- B32B 1/02 (2006.01)
- A61J 1/10 (2006.01)
- B32B 27/08 (2006.01)
- B32B 27/28 (2006.01)
- B32B 27/36 (2006.01)
- B32B 7/00 (2006.01)
- B32B 7/02 (2006.01)
- B32B 7/04 (2006.01)
- B32B 7/12 (2006.01)
- B32B 9/00 (2006.01)
- B32B 15/00 (2006.01)
- B32B 27/00 (2006.01)
- B32B 27/06 (2006.01)
- B32B 27/30 (2006.01)
- B32B 27/32 (2006.01)
- B32B 27/34 (2006.01)
- B32B 1/00 (2006.01)
- B32B 3/00 (2006.01)
- B65D 75/26 (2006.01)
- B65D 77/20 (2006.01)

(52) U.S. Cl.
CPC ... *B32B 7/00* (2013.01); *B32B 7/02* (2013.01); *B32B 7/04* (2013.01); *B32B 7/12* (2013.01); *B32B 9/00* (2013.01); *B32B 15/00* (2013.01); *B32B 19/00* (2013.01); *B32B 27/00* (2013.01); *B32B 27/06* (2013.01); *B32B 27/28* (2013.01); *B32B 27/30* (2013.01); *B32B 27/306* (2013.01); *B32B 27/308* (2013.01); *B32B 27/32* (2013.01); *B32B 27/34* (2013.01); *B32B 1/00* (2013.01); *B32B 1/02* (2013.01); *B32B 3/00* (2013.01); *B32B 2250/24* (2013.01); *B32B 2255/10* (2013.01); *B32B 2255/20* (2013.01); *B32B 2255/26* (2013.01); *B32B 2255/28* (2013.01); *B32B 2307/31* (2013.01); *B32B 2307/412* (2013.01); *B32B 2307/518* (2013.01); *B32B 2307/7246* (2013.01); *B32B 2439/46* (2013.01); *B32B 2439/80* (2013.01); *B65D 75/26* (2013.01); *B65D 77/2024* (2013.01)
USPC ........ 428/470; 428/35.2; 428/35.3; 428/35.4; 428/35.7; 428/35.9; 428/36.7; 428/457; 428/689

(56) References Cited

FOREIGN PATENT DOCUMENTS

| | | |
|---|---|---|
| JP | 2006-289710 A | 10/2006 |
| JP | 2008-194483 A | 8/2008 |
| JP | 2008-201482 A | 9/2008 |
| JP | 2008-207406 A | 9/2008 |
| JP | 2008-296203 A | 12/2008 |
| JP | 2009-143571 A | 7/2009 |
| JP | 2009-248455 A | 10/2009 |
| JP | 2010-42574 A | 2/2010 |
| WO | WO 2006/057177 A1 | 6/2006 |

OTHER PUBLICATIONS

Extended European Search Report issued in corresponding European Application No. 12752595.4 on Aug. 27, 2014 (6 pages).

US 8,968,879 B2

PACKAGING MATERIAL FOR BLOOD BAG AND BLOOD BAG PACKAGING

RELATED APPLICATIONS

This application is a continuation of International Application No. PCT/JP2012/055268 filed on Mar. 1, 2012, and claims priority to Japanese Application No. 2011-044300 filed on Mar. 1, 2011, the entire content of both of which is incorporated herein by reference.

TECHNICAL FIELD

Disclosed is a packaging material for blood bags which has high water vapor permeation resistance for suppressing permeation of water into an anticoagulant solution or a red cell storage solution contained in the blood bag and which has excellent transparency and stability in water vapor permeation resistance even under a high temperature and humidity environment for extended periods of time. Further disclosed is a blood bag packaging obtained by packaging with the packaging material for blood bags.

BACKGROUND DISCUSSION

As a transfusion blood bag vessel, there have been used vessels obtained by forming a film of polyvinyl chloride, polyethylene, polypropylene or the like into the shape of a sack. In general, medicinal liquids such as an anticoagulant solution and a red cell storage solution which are contained in blood bags are often discolored or altered due to oxygen in the air. In addition, since the amounts of the medicinal liquids contained in blood bags are small, the medicinal liquids are susceptible to the influence of concentration variations due to transpiration of water. In order to suppress these phenomena, blood bags are packaged with a packaging material which is excellent in gas barrier properties (water vapor and oxygen barrier properties).

There have been proposed methods in which various gas barrier laminate films are used as a packaging material excellent in gas barrier properties for use in a blood bag. Examples of such packaging material include: a double packaging sack (double packaging material) wherein a polyethylene or polypropylene film is used as an inner packaging material, and a laminate film such as a polyethylene/aluminum foil/polyamide laminate film is used as an outer packaging material, such as described in Japanese Patent Laid-open No. Hei 8-243148; and a double packaging sack (double packaging material) wherein a laminate film having a laminate structure of low-density polyethylene/silica-deposited biaxially oriented polyethylene terephthalate film (deposited PET)/biaxially oriented polyamide film (ONy)/linear low-density polyethylene (LLDPE) film is used as an inner packaging material, and a laminate film having a laminate structure of biaxially oriented polyamide film (ONy)/linear low-density polyethylene (LLDPE) film is used as an outer packaging material such as described in Japanese Patent Laid-open No. 2009-143571.

In addition, as a laminate having transparency and better gas barrier properties, there have been proposed laminates having a structure wherein a laminate film obtained by laminating two laminate films each having a laminate structure of PET/vapor-deposited aluminum oxide film/sol-gel process type barrier coat/vapor-deposited aluminum oxide film/sol-gel process type barrier coat, with the sol-gel process type barrier coat surfaces on the inside, by use of a dry laminate adhesive or the like is laminated with a sol-gel process type barrier coat/CVD-deposited silicon oxide film/ONy and an LLDEP film by use of a dry laminate adhesive or the like, an example of such laminates being a laminate having a laminate structure of PET/vapor-deposited aluminum oxide film/sol-gel process type barrier coat/vapor-deposited aluminum oxide film/sol-gel process type barrier coat/adhesive/sol-gel process type barrier coat/vapor-deposited aluminum oxide film/sol-gel process type barrier coat/vapor-deposited aluminum oxide film/PET/adhesive/sol-gel process type barrier coat/CVD-deposited silicon oxide film/ONy/adhesive/LLDPE film such as described in Japanese Patent Laid-open No. 2009-248455.

However, the gas barrier packaging material proposed in Japanese Patent Laid-open No. Hei 8-243148 and the like is opaque due to the use of the aluminum foil, and the packaging material proposed in Japanese Patent Laid-open No. 2009-143571 and the like having the deposited PET film is essentially a double packaging material, though it has transparency. On the other hand, the laminate proposed in Japanese Patent Laid-open No. 2009-248455 and the like may require a complicated production process as represented for example by the need to perform vapor deposition twice, although it has excellent transparency and excellent gas barrier properties.

SUMMARY

According to one aspect, disclosed is a packaging material for blood bags which has high water vapor permeation resistance for suppressing permeation of water into an anticoagulant solution or a red cell storage solution contained in the blood bag and which has excellent transparency and stability in water vapor permeation resistance even under a high temperature and humidity environment for extended periods of time. According to a further aspect, disclosed is a blood bag packaging obtained by packaging with the packaging material for blood bags.

EXPLANATION OF REFERENCE NUMERALS

Figure 1:
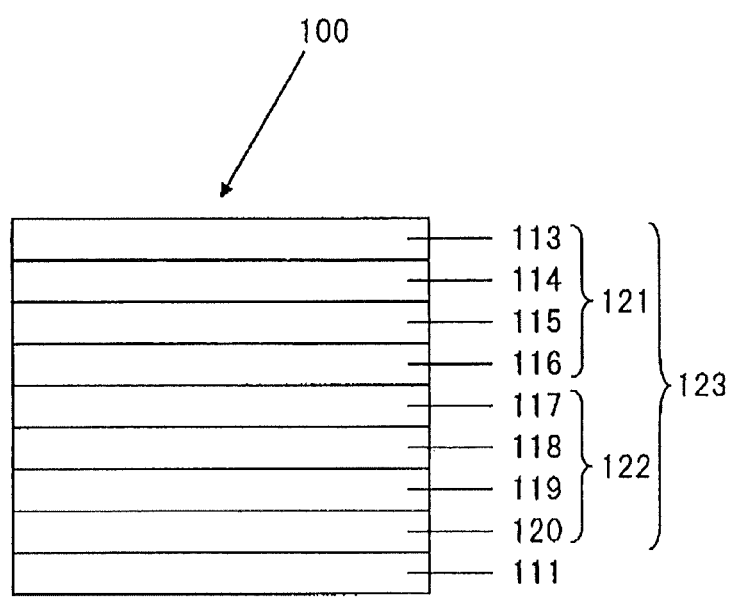
FIG. 1 is a sectional schematic view showing a blood bag packaging material 100, as one exemplary embodiment of a packaging material for blood bags.

100 Packaging material for blood bags
111 Heat seal layer
113 Base layer (Y)
114 Inorganic deposited layer (X)
115 Layer ($Z_1$)
116 Layer ($Z_2$)
117 Layer ($Z_2$)
118 Layer ($Z_1$)
119 Inorganic deposited layer (X)
120 Base layer (Y)
121 Laminate film (I)
122 Laminate film (I)
123 Laminate film (II)
200 Packaging material for blood bags
211 Heat seal layer
212 Reinforcement layer 213 Base layer (Y)
214 Inorganic deposited layer (X)
215 Layer ($Z_1$)
216 Layer ($Z_2$)
217 Layer ($Z_2$)
218 Layer ($Z_1$)
219 Inorganic deposited layer (X)
220 Base layer (Y)
221 Laminate film (I)
222 Laminate film (I)
223 Laminate film (II)
300 Packaging material for blood bags
311 Heat seal layer
312 Reinforcement layer
313 Base layer (Y)
314 Inorganic deposited layer (X)
315 Layer ($Z_1$)
316 Layer ($Z_2$)
317 Layer ($Z_2$)
318 Layer ($Z_1$)
319 Inorganic deposited layer (X)
320 Base layer (Y)
321 Laminate film (I)
322 Laminate film (I)
323 Laminate film (II)

DETAILED DESCRIPTION (1) Packaging Material for Blood Bags

According to an exemplary aspect, disclosed is a laminate film (I) which includes a base layer (Y), an inorganic deposited layer (X) formed on top of the base layer (Y), a layer ($Z_1$) containing a polymer (a) of an unsaturated carboxylic acid compound polyvalent metal salt (A) formed on top of the inorganic deposited layer (X), and a layer ($Z_2$) containing a polymer (a) of an unsaturated carboxylic acid compound polyvalent metal salt (A) and a vinyl alcohol based polymer (b) formed on top of the layer ($Z_1$), wherein at least two laminate films (I) with the layers ($Z_2$) on the inside are laminated to form a laminate film (II), and a heat seal layer is laminated on top of at least either one of the base layers (Y) of the laminate film (II). In a preferred exemplary aspect, a reinforcement layer and the heat seal layer are laminated in this order on top of at least one of the base layers (Y). In a further preferred exemplary aspect, a reinforcement layer is laminated on top of at least one of the base layers (Y), and the heat seal layer is laminated on top of at least the other of the base layers (Y). The packaging material for blood bags can stably exhibit high gas barrier properties even in a severe environment for a long time, so that it can suppress a loss in weight of a volatile component, such as water of a medicinal liquid in blood bags, and oxidation due to an influence of oxygen present in air, and therefore is effective for long-time preservation of a product. Furthermore, since the packaging material is transparent, the state of the contents thereof can be visually checked and, in some cases, mixing-in of foreign matter can be prevented.

Disclosed are the following exemplary aspects.

(1) A packaging material for blood bags including a laminate film (I) including a base layer (Y), an inorganic deposited layer (X) formed on top of the base layer (Y), a layer ($Z_1$) containing a polymer (a) of an unsaturated carboxylic acid compound polyvalent metal salt (A) formed on top of the inorganic deposited layer (X), and a layer ($Z_2$) containing a polymer (a) of an unsaturated carboxylic acid compound polyvalent metal salt (A) and a vinyl alcohol based polymer (b) formed on top of the layer ($Z_1$), wherein at least two laminate films (I) are laminated with the layers ($Z_2$) on the inside to form a laminate film (II), and a heat seal layer is laminated on top of at least either one of the base layers (Y) of the laminate film (II).

(2) The packaging material for blood bags as described in paragraph (1), wherein a reinforcement layer and the heat seal layer are laminated in this order on top of at least one of the base layers (Y).

(3) The packaging material for blood bags as described in paragraph (1), wherein a reinforcement layer is laminated on top of at least one of the base layers (Y), and the heat seal layer is laminated on top of at least the other of the base layers (Y).

(4) The packaging material for blood bags as described in any one of paragraphs (1) to (3), wherein the base layer (Y) is a biaxially oriented polyethylene terephthalate film.

(5) The packaging material for blood bags as described in any one of paragraphs (1) to (4), wherein the unsaturated carboxylic acid compound polyvalent metal salt (A) is a salt of an unsaturated carboxylic acid compound having a polymerization degree of less than 20 with a polyvalent metal compound.

(6) The packaging material for blood bags as described in any one of paragraphs (1) to (4), wherein the unsaturated carboxylic acid compound polyvalent metal salt (A) is a salt of acrylic acid with zinc.

(7) The packaging material for blood bags as described in any one of paragraphs (1) to (6), wherein the vinyl alcohol based polymer (b) is a modified vinyl alcohol based polymer (b1).

(8) The packaging material for blood bags as described in any one of paragraphs (1) to (7), wherein the reinforcement layer is a biaxially oriented polyamide film.

(9) A blood bag packaging wherein a blood bag is packaged with the packaging material for blood bags as described in any one of paragraphs (1) to (8).

(10) A blood bag packaging wherein an upper surface of a vessel with a blood bag accommodated therein is heat sealed with the packaging material for blood bags as described in any one of paragraphs (1) to (8).

In one aspect, the packaging material for blood bags has a structure in which at least two laminate films (I) having gas barrier properties are laminated, with their layers ($Z_2$) on the inside, the structure permitting the packaging material to exhibit excellent gas barrier properties without going through complicated steps and to maintain the excellent gas barrier properties for extended periods of time. Accordingly, it is possible to easily produce a packaging material capable of suppressing transpiration of water in an anticoagulant solution, a red cell storage solution or the like contained in a blood bag even under a high temperature and humidity environment, and which is capable of preserving the blood bag while maintaining the stability of the medicinal liquid for a long period of time from the production to the opening of the blood bag. Furthermore, since transparency is secured while maintaining the high gas barrier properties, the packaging material can be used as a substitute for a conventional packaging formed by use of an opaque aluminum foil laminate material.

A sectional schematic view of a blood bag packaging material 100, as one embodiment of the packaging material for blood bags is shown in FIG. 1. The blood bag packaging material 100 shown in FIG. 1 includes a laminate film (II) 123 formed by laminating two laminate films (I) 121 and 122 which include base layers (Y) 113 and 120, inorganic deposited layers (X) 114 and 119 formed on top of the base layers (Y) 113 and 120, layers ($Z_1$) 115 and 118 containing a polymer (a) of an unsaturated carboxylic acid compound polyvalent metal salt (A) formed on top of the inorganic deposited layers (X) 114 and 119, and layers ($Z_2$) 116 and 117 containing a polymer (a) of an unsaturated carboxylic acid compound polyvalent metal salt (A) and a vinyl alcohol based polymer (b) formed on top of the layers ($Z_1$) 115 and 118, with the layers ($Z_2$) 116 and 117 on the inside, and laminating a heat seal layer 111 on top of one of the base layers (Y) 120 of the laminate film (II) 123. A reinforcement layer can be added between any of the adjacent layers in the blood bag packaging material 100. For example, a reinforcement layer can be provided between the heat seal layer 111 and the base layer (Y). FIG. 1 is a schematic view, wherein the relative thicknesses of the layers or laminate films are not necessarily proportional to the relative thicknesses of layers or laminate films in an actual packaging material for blood bags.

Figure 2:
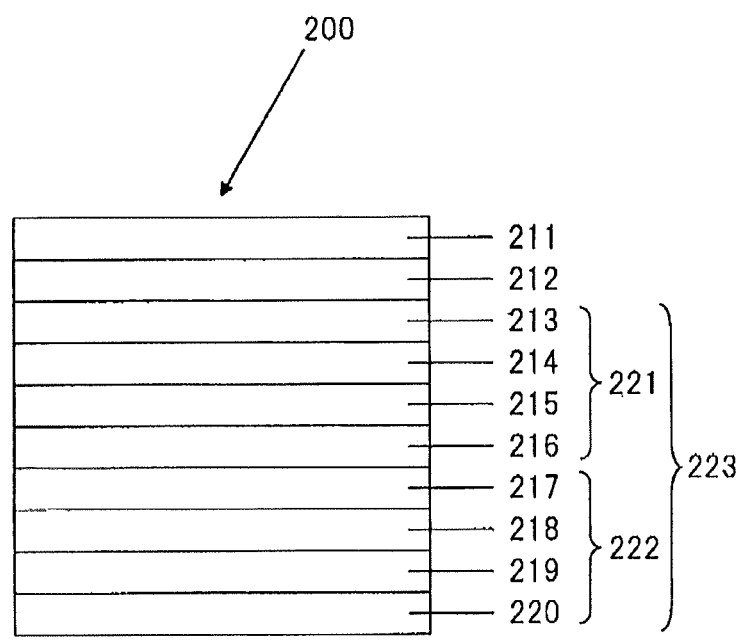
FIG. 2 is a sectional schematic view showing a blood bag packaging material 200, as another exemplary embodiment of the packaging material for blood bags.

A sectional schematic view of a blood bag packaging material 200, as another embodiment of the packaging material for blood bags is shown in FIG. 2. The blood bag packaging material 200 shown in FIG. 2 includes a laminate film (II) 223 formed by laminating two laminate films (I) 221 and 222 which include base layers (Y) 213 and 220, inorganic deposited layers (X) 214 and 219 formed on top of the base layers (Y) 213 and 220, layers ($Z_1$) 215 and 218 containing a polymer (a) of an unsaturated carboxylic acid compound polyvalent metal salt (A) formed on top of the inorganic deposited layers (X) 214 and 219, and layers ($Z_2$) 216 and 217 containing a polymer (a) of an unsaturated carboxylic acid compound polyvalent metal salt (A) and a vinyl alcohol based polymer (b) formed on top of the layers ($Z_1$) 215 and 218, with the layers ($Z_2$) 216 and 217 on the inside, and laminating a reinforcement layer 212 and a heat seal layer 211 in this order on top of the base layer (Y) on one side. FIG. 2 is a schematic view, wherein the relative thicknesses of the layers or laminate films are not necessarily proportional to the relative thicknesses of layers or laminate films in an actual packaging material for blood bags.

Figure 3:
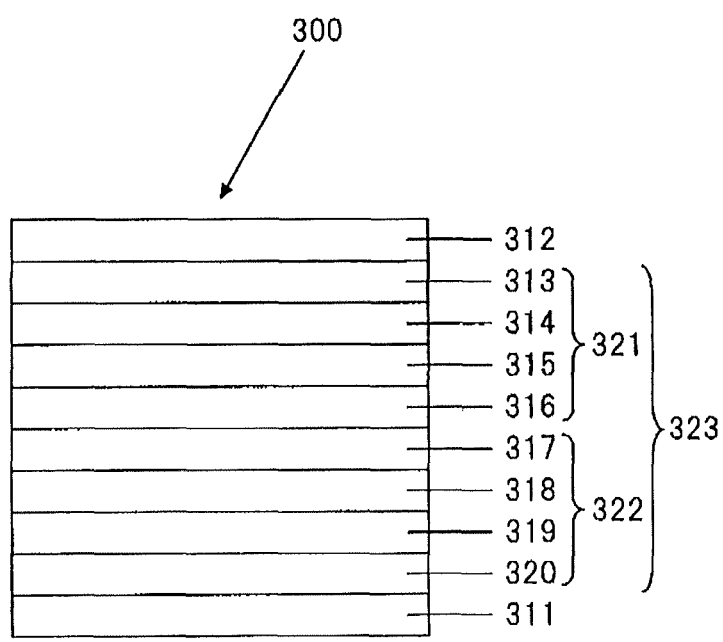
FIG. 3 is a sectional schematic view showing a blood bag packaging material 300, as a further exemplary embodiment of the packaging material for blood bags.

A sectional schematic view of a blood bag packaging material 300, as a further embodiment of the packaging material for blood bags is shown in FIG. 3. The blood bag packaging material 300 shown in FIG. 3 includes a laminate film (II) 323 formed by laminating two laminate films (I) 321 and 322 which include base layers (Y) 313 and 320, inorganic deposited layers (X) 314 and 319 formed on top of the base layers (Y) 313 and 320, layers ($Z_1$) 315 and 318 containing a polymer (a) of an unsaturated carboxylic acid compound polyvalent metal salt (A) formed on top of the inorganic deposited layers (X) 314 and 319, and layers ($Z_2$) 316 and 317 containing a polymer (a) of an unsaturated carboxylic acid compound polyvalent metal salt (A) and a vinyl alcohol based polymer (b) formed on top of the layers ($Z_1$) 315 and 318, with the layers ($Z_2$) 316 and 317 on the inside, laminating a reinforcement layer 312 on top of the base layer (Y) 313 on one side of the laminate film (II) 323, and laminating a heat seal layer 311 on the base layer (Y) 320 on the other side of the laminate film (II) 323. FIG. 3 is a schematic view, wherein the relative thicknesses of the layers or laminate films are not necessarily proportional to the relative thicknesses of layers or laminate films in an actual packaging material for blood bags.

A more detailed description will now be provided of the base layer (Y), the inorganic deposited layer (X), the layer ($Z_1$) containing a polymer (a) of an unsaturated carboxylic acid compound polyvalent metal salt (A), the layer ($Z_2$) containing a polymer (a) of an unsaturated carboxylic acid compound polyvalent metal salt (A) and a vinyl alcohol based polymer (b), the laminate film (I), and the laminate film (II), as well as the reinforcement layer and the heat seal layer, which constitute the packaging material for blood bags according to exemplary aspects.

Base Layer (Y)

The base layer (Y) constituting the packaging material for blood bags is formed from any of various known thermoplastic resins. Examples of the known thermoplastic resins include polyolefins (polyethylene, polypropylene, poly-4-methyl-1-pentene, polybutene, etc.), polyesters (polyethylene terephthalate, polybutylene terephthalate, polyethylene naphthalate, etc.), polyamides (nylon-6, nylon-66, polymetaxylene adipamide, etc.), polyvinyl chloride, polyimides, ethylene-vinyl acetate copolymer and saponified product thereof, polyvinyl alcohol, polyacrylonitrile, polycarbonates, polystyrene, ionomers, fluoro-resins, and mixtures thereof. Among these resins, polypropylene, polyethylene terephthalate, polyethylene naphthalate, polyamides and the like are preferable because they make it possible to obtain a base layer (Y) excellent in stretchability and transparency. Furthermore, among the base layers (Y) formed from these thermoplastic resins, biaxially oriented polypropylene films, biaxially oriented polyethylene terephthalate films, biaxially oriented polyethylene naphthalate films, and biaxially oriented polyamide films are preferred, and the biaxially oriented polyethylene terephthalate films are particularly preferred, since they are excellent in transparency, rigidity, mechanical strength, and heat resistance.

In addition, for improving adhesion of these base layers (Y) to the inorganic deposited layer or an adhesive, the surfaces of the base layers (Y) may be preliminarily subjected to a surface activation treatment such as corona treatment, flame treatment, plasma treatment, or flame treatment.

Inorganic Deposited Layer (X)

The inorganic deposited layer (X) formed on top of the base layer (Y) constituting the packaging material for blood bags is a thin film formed from an inorganic matter. Specific examples of the inorganic matter include inorganic atoms such as silicon, zinc, aluminum, titanium, zirconium, tin, magnesium, indium, etc. and inorganic compounds such as oxides, nitrides, fluorides and oxynitrides of the inorganic atoms, and their composites.

The method for forming the inorganic deposited layer (X) constituting the packaging material for blood bags is not specifically restricted, and may be a vacuum evaporation process, chemical vapor phase growth process, physical vapor deposition process, chemical vapor deposition process (CVD process), sol-gel process or the like. Among these processes, preferable are reduced-pressure film forming processes such as sputtering, ion plating, chemical vapor deposition (CVD), physical vapor deposition (PVD), and plasma-enhanced CVD. This ensures rapid reaction of silicon-containing chemically active molecule species, such as silicon nitride or silicon oxynitride, whereby it is expected that surface smoothness of the inorganic deposited layer (X) is enhanced and the number of pores is reduced. The thickness of the inorganic deposited layer (X) is preferably 0.1 to 1,000 nm, more preferably 1 to 500 nm.

The inorganic deposited layer (X) constituting the packaging material for blood bags preferably has its surface preliminarily subjected to a surface modification treatment. Examples of the surface modification treatment include plasma treatment and corona treatment. In this case, by using an oxygen gas, a nitrogen gas, an inert gas, air or the like, it is possible to enhance adhesion of the surface to the layer containing a polymer of an unsaturated carboxylic acid compound polyvalent metal salt.

Layer ($Z_1$) Containing Polymer (a) of Unsaturated Carboxylic Acid Compound Polyvalent Metal Salt (A)

The layer ($Z_1$) containing a polymer (a) of an unsaturated carboxylic acid compound polyvalent metal salt (A) formed on top of the surface of the inorganic deposited layer (X) of the base layer (Y) constituting the packaging material for blood bags is a layer which is obtained by polymerization of the unsaturated carboxylic acid compound polyvalent metal salt (A).

The thickness of the layer ($Z_1$) containing a polymer (a) of an unsaturated carboxylic acid compound polyvalent metal salt (A) constituting the packaging material for blood bags is 0.01 to 100 μm, preferably 0.05 to 50 μm, and more preferably 0.1 to 10 μm.

Unsaturated Carboxylic Acid Compound

An unsaturated carboxylic acid compound for forming the unsaturated carboxylic acid compound polyvalent metal salt (A) is a carboxylic acid compound having an α,β-ethylenically unsaturated group, such as acrylic acid, methacrylic acid, maleic acid, and itaconic acid. The unsaturated carboxylic acid compound is a compound having a polymerization degree of less than 20, preferably a monomer or a polymer with a polymerization degree of not more than 10. In the case where a polymer (polymeric compound) with a polymerization degree of more than 20 is used, its salt with a polyvalent metal described later may not be formed completely, and, as a result, the layer obtained by polymerization of the metal salt may be poor in gas barrier properties in a high-humidity condition. These unsaturated carboxylic acid compounds may be used either singly or as a mixture of two or more. Among these unsaturated carboxylic acid compounds, the monomers are preferred because they can provide easy formation of a salt thereof completely neutralized by the polyvalent metal compound, and ensure that the blood bag packaging material wherein a layer of a polymer obtained by polymerization of the salt is laminated at least on one side of the base layer (Y) is particularly excellent in gas barrier properties in high-humidity conditions.

Polyvalent Metal Compound

The polyvalent metal compound, as a component for forming the unsaturated carboxylic acid compound polyvalent metal salt (A) is any of the metals belonging to the Groups 2A to 7A, Groups 1B to 3B and Group 8 of the periodic table and compounds of the metals. Specific examples of the polyvalent metal compound include metals with a valency of two or more, such as magnesium (Mg), calcium (Ca), strontium (Sr), barium (Ba), iron (Fe), cobalt (Co), nickel (Ni), copper (Cu), zinc (Zn), and aluminum (Al), as well as oxides, hydroxides, halides, carbonates, phosphates, phosphites, hypophosphites, sulfates, sulfites and the like of these metals. Among these metal compounds, preferred are bivalent metal compounds, and particularly preferred are magnesium oxide, calcium oxide, barium oxide, zinc oxide, magnesium hydroxide, calcium hydroxide, barium hydroxide, zinc hydroxide and the like. The use of these bivalent metal compounds ensures that the films obtained by polymerization of salts of the bivalent metal compounds with the unsaturated carboxylic acids are particularly excellent in gas barrier properties in high-humidity conditions. At least one of these polyvalent metal compounds is used. That is, these polyvalent metal compounds may be used either singly or in combination of two or more. Among these polyvalent metal compounds, preferred are Mg, Ca, Zn, Ba and Al, and particularly preferred is Zn.

Unsaturated Carboxylic Acid Compound Polyvalent Metal Salt (A)

The unsaturated carboxylic acid compound polyvalent metal salt (A) is preferably a salt of an unsaturated carboxylic acid compound having a polymerization degree of less than 20 with a polyvalent metal compound. These unsaturated carboxylic acid compound polyvalent metal salts may be used either singly or as a mixture of two or more. Among the unsaturated carboxylic acid compound polyvalent metal salt (A), zinc (meth)acrylate is preferred in view of excellent hot water resistance of a polymer layer obtained by use thereof.

Layer ($Z_2$) Containing Polymer (a) of Unsaturated Carboxylic Acid Compound Polyvalent Metal Salt (A) and Vinyl Alcohol Based Polymer (b)

The layer formed on top of the layer ($Z_1$) constituting the packaging material for blood bags is a layer ($Z_2$) which contains the polymer (a) of the unsaturated carboxylic acid compound polyvalent metal salt (A) as above-mentioned and a vinyl alcohol based polymer (b).

Vinyl Alcohol Based Polymer (b)

The vinyl alcohol based polymer (b) is polyvinyl alcohol, an ethylene-vinyl alcohol copolymer, a modified vinyl alcohol based polymer or the like. The polyvinyl alcohol is not specifically restricted insofar as it can be mixed; preferably, however, the polyvinyl alcohol has a polymerization degree of 100 to 3,000, more preferably 200 to 2,500, and further preferably 300 to 2,000. Where the polymerization degree is 100 to 3,000, the polyvinyl alcohol in the state of an aqueous solution can be mixed with the unsaturated carboxylic acid compound polyvalent metal salt (A), and the resulting mixture can be easily applied onto the layer ($Z_1$), to provide good gas barrier properties. The saponification degree is preferably not less than 90%, more preferably not less than 95%. A saponification degree of not less than 90% promises good gas barrier properties. Besides, an olefin-containing polyvinyl alcohol may be used in view of water resistance. The olefin content is preferably 0 to 25 mol %, more preferably 1 to 20 mol %, and further preferably 2 to 16 mol %. As the olefin, those having not more than four carbon atoms are preferred, examples of which include ethylene, propylene, n-butene, and isobutene and the like. Among these, ethylene is most preferable from the viewpoint of water resistance. In addition, preferable examples of the vinyl alcohol based polymer include modified vinyl alcohol based polymers.

Modified Vinyl Alcohol Based Polymer (b1)

Examples of the modified vinyl alcohol based polymer (b1) include: those obtained by modifying a vinyl alcohol based polymer (b) by linking thereto any of groups (reactive groups) having reactivity, through addition, substitution, esterification or the like; those formed by saponifying copolymers which are obtained by copolymerization of a vinyl ester such as vinyl acetate with an unsaturated compound having a reactive group and the like. Examples of the reactive polymerizable group include (meth)acrylate group, (meth)acryloyl group, (meth)acrylamide group, vinyl group, allyl group, styryl group, thiol group, silyl group, acetoacetyl group, and epoxy group. The amount of the reactive groups may be determined as required. However, when the amount of OH groups in the vinyl alcohol based polymer serving as a skeleton is reduced, the gas barrier properties intrinsic of the vinyl alcohol based polymer may be also reduced. Therefore, the amount of the reactive group is preferably in the range of 0.001 to 50 mol % (the total amount of the reactive groups and the OH groups accounts for 100 mol %).

Examples of the method for producing the modified vinyl alcohol based polymer (b1) include: modifying the vinyl alcohol based polymer (b) through linking thereto any of various known groups (reactive groups) having reactivity through addition, substitution, esterification or the like; and saponifying copolymers obtained by copolymerization of a vinyl ester such as vinyl acetate with an unsaturated compound having the reactive group, and the like. The modified vinyl alcohol based polymer (b1) is not specifically restricted insofar as it has the reactive group in its molecule.

As the modified vinyl alcohol based polymer (b1), those having a polymerization degree in the range of 100 to 3,000 are preferably used, and those having a polymerization degree in the range of 300 to 2,000 are more preferably used. In addition, from the viewpoint of gas barrier properties of the polymer obtained by using the modified vinyl alcohol based polymer (b1) jointly with the unsaturated carboxylic acid compound polyvalent metal salt (A), those modified vinyl alcohol based polymers having a high saponification degree of 70 to 99.9% are preferably used, and those having a saponification degree of 85 to 99.9% are particularly preferably used. Specific examples of the reactive group possessed by these modified vinyl alcohol based polymers (b1) include (meth)acrylate group, (meth)acryloyl group, (meth)acrylamide group, vinyl group, allyl group, styryl group, thiol group, silyl group, acetoacetyl group, and epoxy group. The amount of the reactive groups in the modified vinyl alcohol based polymer may be determined as required. However, when the amount of the OH groups in the vinyl alcohol based polymer serving as a skeleton is reduced, the gas barrier properties intrinsic of the vinyl alcohol based polymer may be also reduced. Therefore, the amount of the reactive groups is preferably in the range of 0.001 to 50 mol % (the total amount of the reactive groups and the OH groups accounts for 100 mol %). In addition, as the modified vinyl alcohol based polymer (b1), those which are soluble in water, lower alcohols, organic solvents or the like are preferable, and those which are soluble in water or in water-lower alcohol based mixed solvents are more preferable.

By use of the modified vinyl alcohol based polymers (b1) modified with the reactive group as one of the components, it is ensured that upon mixing and polymerization of the modified vinyl alcohol based polymer (b1) with the unsaturated carboxylic acid compound polyvalent metal salt (A), a layer ($Z_2$) improved in gas barrier properties in low-humidity conditions composed of a polymer in which at least a part of the modified vinyl alcohol based polymer (b1) and the unsaturated carboxylic acid compound polyvalent metal salt (A) has undergone some linking is obtained.

Specific examples of the modified vinyl alcohol based polymer (b1) include: (meth)acrylate group-modified vinyl alcohol based polymers (b1a) obtained by reacting part of the OH groups of a vinyl alcohol based polymer serving as a skeleton with a carboxylic acid compound having an α,β-ethylenically unsaturated group, such as acrylic acid, methacrylic acid, maleic acid, fumaric acid, itaconic acid, etc. or a derivative thereof to introduce a (meth)acrylate group into the polymer; thiol group-modified vinyl alcohol based polymers (b1b) having thiol groups (—SH groups) replacing part of the OH groups of a vinyl alcohol based polymer serving as a skeleton, obtained by a method wherein a vinyl monomer having an isothiuronium salt or a thiol acid ester is copolymerized with vinyl acetate and the resulting polymer is decomposed with an acid or a base to form thiol groups, a method wherein a reactive functional group is introduced into a side chain of a vinyl alcohol based polymer by a polymer reaction, a method wherein vinyl esters are polymerized in the presence of thiol acid and the resulting polymer is saponified to introduce a thiol group only into a terminal end of molecule, or the like method; silyl group-modified vinyl alcohol based polymers (b1c) having a trialkoxysilane group such as trimethoxysilane group, triethoxysilane group, etc., a tricarbonyloxysilane group or the like in part of the OH groups of a vinyl alcohol based polymer serving as a skeleton, obtained by a method wherein a silyl group is added to the vinyl alcohol based polymer or a vinyl acetate based polymer having a carboxyl group or hydroxyl group by post-modification using a silylating agent such as an organohalogenisilane, an organoacetoxysilane, an organoalkoxysilane, etc., a method wherein a copolymer of vinyl acetate with a silyl group-containing olefinically unsaturated compound such as vinylsilane, a (meth)acrylamide-alkylsilane, etc. is saponified to introduce a silyl group such as an alkoxysilyl group, an acryloxysilyl group or a silanol group obtained by hydrolysis thereof, a salt thereof or the like into the molecule of the copolymer, or a like method; acetoacetyl group-modified vinyl alcohol based polymers (b1d) having acetoacetyl group in part of the OH groups of a vinyl alcohol based polymer serving as a skeleton, obtained by a method wherein a vinyl alcohol based polymer is preliminarily dispersed in an acetic acid solvent and a diketene is added thereto, a method wherein a vinyl alcohol based polymer is preliminarily dissolved in a solvent such as dimethylformamide, dioxane, etc. and a diketene is added thereto, a method wherein a diketene gas or a liquid diketene is brought into direct contact with a vinyl alcohol based polymer, or the like method; other modified vinyl alcohol based polymers having other radial polymerization groups such as (meth)acrylamide group, allyl group, vinyl group, styryl group, intramolecular double bond, vinyl ether group, etc. added into the molecule of a vinyl alcohol based polymer, other modified vinyl alcohol based polymers having a cationic polymerization group such as epoxy group, glycidyl ether group, etc. added into the molecule of a vinyl alcohol based polymer, and the like modified vinyl alcohol based polymers, obtained by various known methods such as a method wherein a monomer having a reactive functional group is copolymerized with vinyl acetate and the copolymer is saponified to introduce the reactive functional group into a side chain, a method wherein a reactive functional group is introduced into a side chain of polyvinyl alcohol by a polymer reaction, or a method wherein a reactive functional group is introduced into a terminal end of the molecule of a vinyl alcohol based polymer by utilizing a chain transfer reaction.

Among these modified vinyl alcohol based polymers (b1), the (meth)acrylate group-modified vinyl alcohol based polymers (b1a) ensure, when used to obtain a polymer which forms a layer, that the layer is excellent in gas barrier properties (oxygen barrier properties) in high-humidity conditions and in low-humidity conditions, is free of reduced gas barrier properties (hot water resistance) after a hydrothermal treatment, and has flexibility. In addition, where a laminate, particularly a film, provided with such a layer is used as a packaging material or the like, heat seal strength is improved.

(Meth)Acrylate Group-Modified Vinyl Alcohol Based Polymer (b1a)

The (meth)acrylate group-modified vinyl alcohol based polymer (b1a) is preferably such that the amount of (meth)acryloyl groups (in comparison with the —OH groups; degree of esterification) is in the range of 0.001 to 50%, more preferably in the range of 0.1 to 40%. If the degree of esterification is less than 0.001%, the resulting layer (Y) may not be improved in hot water resistance, flexibility or the like. When the degree of esterification is more than 50%, on the other hand, the resulting layer (Y) may not be improved in hot water resistance, oxygen barrier properties or the like. The (meth)acrylate group-modified vinyl alcohol based polymer (b1a) can be obtained, for example, by reacting a vinyl alcohol based copolymer with (meth)acrylic acid or a (meth)acrylic acid derivative such as (meth)acrylic acid halides, (meth)acrylic acid anhydride, (meth)acrylic acid esters, etc. in the presence of or in the absence of such catalysts as Bronsted acids, Bronsted bases, Lewis acids, Lewis bases, and metal compounds. In addition, (meth)acrylate groups can be indirectly introduced into a vinyl alcohol based copolymer by reacting the vinyl alcohol based copolymer with a (meth) acrylic acid derivative having in its molecule a functional group reactive with the OH group of the vinyl alcohol based copolymer, such as glycidyl(meth)acrylate, and 2-isocyanatoethyl(meth)acrylate.

Thiol Group-Modified Vinyl Alcohol Based Polymer (b1b)

The thiol group-modified vinyl alcohol based polymer (b1b) is a polymer having a thiol group inserted into the molecule by a known method, such as a method wherein a vinyl monomer having an isothiuronium salt or a thiol acid ester is copolymerized with vinyl acetate and the resulting polymer is decomposed by an acid or a base to form thiol groups, a method wherein a reactive functional group is introduced into a side chain of a polyvinyl alcohol based polymer by a polymer reaction, and a method wherein a vinyl ester such as vinyl formate, vinyl acetate, vinyl propionate, vinyl versate, vinyl laurate, vinyl stearate, etc. is polymerized in the presence of a thiolcarboxylic acid including thiol acids having a —COSH group such as thiolacetic acid, thiolpropionic acid, thiolbutyric acid, etc. and the resulting polymer is saponified to introduce a thiol group only into the terminal end of the molecule of the polymer. The thiol group-modified vinyl alcohol based polymer (b1b) preferably has a thiol group modification degree in the range of 0.1 to 50 mol %.

As these thiol group-modified vinyl alcohol based polymers (b1b), for example, polymers "M-115" and "M-205" under the trade name of Kuraray M-Polymer are produced and sold by Kuraray Co., Ltd.

Silyl Group-Modified Vinyl Alcohol Based Polymer (b1c)

Examples of the silyl group-modified vinyl alcohol based polymer (b1c) include polymers having a silyl group such as alkoxysilyl groups, acyloxysilyl groups, or silanol groups as their hydrolyzed products, or their salts, etc. introduced into the molecule thereof, obtained by a method wherein a silyl group is added to a vinyl alcohol based polymer or a vinyl acetate based polymer having a carboxyl group or a hydroxyl group by post-modification using a silylating agent such as organohalogensilanes (e.g., trimethylchlorosilane, dimethyldichlorosilane, methyltrichlorosilane, vinyltrichlorosilane, diphenyldichlorosilane), organoacetoxysilanes (e.g., trimethylacetoxysilane, dimethyldiacetoxysilane), organoalkoxysilane (e.g., trimethoxysilane, dimethyldimethoxysilane), etc., a method wherein a copolymer of vinyl acetate with a silyl group-containing olefinically unsaturated compound such as vinylsilanes, e.g., vinyltrimethoxysilane, vinyltriethoxysilane, vinyltris-(β-methoxyethoxy)silane, vinyltriacetoxysilane, allyltrimethoxysilane, allyltriacetoxysilane, vinylmethyldimethoxysilane, vinyldimethylmethoxysilane, vinylmethyldiethoxysilane, vinyldimethylethoxysilane, vinylmethyldiacetoxysilane, vinyldimethylacetoxysilane, vinylisobutyldimethoxysilane, vinyltriisopropoxysilane, vinyltributoxysilane, vinyltrihexyloxysilane, vinylmethoxydihexyloxysilane, or vinyldimethoxyoctyloxysilane, and (meth)acrylamide-alkylsilanes, e.g., 3-(meth)acrylamide-propyltrimethoxysilane, 3-(meth)acrylamido-propyltriethoxysilane, 3-(meth)acrylamido-propyltri(β-methoxyethoxy)silane, 2-(meth)acrylamido-2-methylpropyltrimethoxysilane, 2-(meth)acrylamide-2-methylethyltrimethoxysilane, N-(2-(meth)acrylamidoethyl)-aminopropyltrimethoxysilane, 3-(meth)acrylamidopropyltriacetoxysilane, 2-(meth)acrylamidoethyltrimethoxysilane, 1-(meth)acrylamidomethyltrimethoxysilane, 3-(meth)acrylamidopropylmethyldimethoxysilane, 3-(meth)acrylamido-propyldimethylmethoxysilane, 3-(N-methyl-(meth)acrylamido)-propyltrimethoxysilane, 3-((meth)acrylamido-methoxy)-3-hydroxypropyltrimethoxysilane, or 3-((meth)acrylamido-methoxy)-propyltrimethoxysilane, is saponified, or the like method. The silyl group modification amount is preferably in the range of 0.1 to 50 mol %.

As the silyl group-modified vinyl alcohol based polymers (b1c), for example, polymers "R-1130," "R-2105" and "R-2130" under the trade name Kuraray R-Polymer are produced and sold by Kuraray Co., Ltd.

Acetoacetyl Group-Modified Vinyl Alcohol Based Polymer (b1d)

The acetoacetyl group-modified vinyl alcohol based polymer (b1d) is a polymer obtained by an addition reaction in which a liquid or gaseous diketene is added to a solution, a dispersion or a powder of a vinyl alcohol based polymer. The degree of acetoacetylation is preferably in the range of 1 to 10 mol %, more preferably in the range of 3 to 5 mol %.

As the acetoacetyl group-modified vinyl alcohol based polymer (b1d), for example, polymers under the trade names of "Gohsefimer Z100," "Z200," "Z200H and "Z210" are produced and sold by The Nippon Synthetic Chemical Industry Co., Ltd.

In addition, the modified vinyl alcohol based polymer is preferably a polymer soluble in water, lower alcohols and organic solvents, and more preferably a polymer soluble in water-lower alcohol mixed solvents. To the aqueous solution of the vinyl alcohol based polymer inclusive of the modified vinyl alcohol based polymer, solvents other than water, for example, alcohols such as methanol, ethanol, isopropanol, etc., ketones such as acetone, methyl ethyl ketone, etc. or other solvents such as diethyl ether, tetrahydrofuran, etc. may be added, as required, either singly or in combination of two or more of them. Besides, various additives such as wettability improvers, antistatic agents, etc. may be added to the polyvinyl alcohol based polymer in such ranges as not to provide significant adverse effects.

The layer ($Z_2$) containing a polymer (a) of an unsaturated carboxylic acid compound polyvalent metal salt (A) and a vinyl alcohol based polymer (b) preferably contains the polymer (a) of the unsaturated carboxylic acid compound polyvalent metal salt in an amount of 1 to 99 wt % and the vinyl alcohol based polymer (b) in an amount of 1 to 99 wt %. More preferably, the layer ($Z_2$) contains the polymer (a) of the unsaturated carboxylic acid compound polyvalent metal salt in an amount of 60 to 98 wt % and the vinyl alcohol based polymer (b) in an amount of 2 to 40 wt %. Further preferably, the layer ($Z_2$) contains the polymer (a) of the unsaturated carboxylic acid compound polyvalent metal salt in an amount of 70 to 95 wt % and the (b) in an amount of 5 to 30 wt %. The total amount of (a) and (b) is regarded as 100 wt %.

Laminate Film (I)

The laminate film (I) constituting the packaging material for blood bags is a laminate film which includes: the layer ($Z_1$) containing the polymer (a) of the unsaturated carboxylic acid compound polyvalent metal salt (A) formed on the surface of the inorganic deposited layer (X) of the base layer (Y) formed with the inorganic deposited layer (X); and the layer ($Z_2$) containing the polymer (a) of the unsaturated carboxylic acid compound polyvalent metal salt (A) and the vinyl alcohol based polymer (b) formed on top of the layer ($Z_1$).

Method for Producing Laminate Film (I)

The laminate film (I) constituting the packaging material for blood bags can be produced, for example, by a method set forth as follows. A solution of a polyvalent metal salt of an unsaturated carboxylic acid compound having a polymerization degree of less than 20 is applied to a surface of the inorganic deposited layer (X) of the base layer (Y), and the polyvalent metal salt of the unsaturated carboxylic acid compound is polymerized to form the layer ($Z_1$) containing the polymer (a). Then, a mixture produced by mixing a solution of a polyvalent metal salt of an unsaturated carboxylic acid compound having a polymerization degree of less than 20 with a vinyl alcohol based polymer (b) in predetermined amounts is applied to the layer ($Z_1$) containing the polymer (a), and the polyvalent metal salt (A) of the unsaturated carboxylic acid compound having a polymerization degree of less than 20 is polymerized to form the layer ($Z_2$) containing the polymer (a) of the unsaturated carboxylic acid compound polyvalent metal salt (A) and the vinyl alcohol based polymer (b). Alternatively, a producing method in which the layer ($Z_1$) or the layer ($Z_2$) is formed by coating singly, a producing method wherein the layer ($Z_1$) and the layer ($Z_2$) are formed by coating in multiple layers, or a producing method wherein a layer containing other additive(s) is provided, can be adopted to produce the laminate film (I).

In addition, the layer of the polymer (a) or the layer containing the polymer (a) and the vinyl alcohol based polymer (b), constituting the packaging material for blood bags, can be obtained by a method wherein a solution containing an unsaturated carboxylic acid compound having a polymerization degree of less than 20 and a polyvalent metal compound is applied onto an inorganic deposited layer (X), then the polyvalent metal salt of the unsaturated carboxylic acid compound is formed, and thereafter the polyvalent metal salt of the unsaturated carboxylic acid compound is polymerized, or by a method wherein a solution containing the vinyl alcohol based polymer (b) as well as an unsaturated carboxylic acid compound having a polymerization degree of less than 20 and a polyvalent metal compound is applied onto ($Z_1$), then the polyvalent metal salt of the unsaturated carboxylic acid compound is formed, and thereafter the polyvalent metal salt of the unsaturated carboxylic acid compound is polymerized.

As a method for preparing the solution of the unsaturated carboxylic acid compound polyvalent metal salt or the like, there may be adopted a method wherein an unsaturated carboxylic acid and a polyvalent metal compound are preliminarily reacted to form the polyvalent metal salt of the unsaturated carboxylic acid compound, and thereafter the unsaturated carboxylic acid compound polyvalent metal salt is dissolved in a solvent, such as water, to prepare the solution. Alternatively, a method may be adopted wherein the unsaturated carboxylic acid compound and the polyvalent metal compound are directly dissolved in the solvent, to prepare the solution of the polyvalent metal salt.

In the case of directly dissolving the unsaturated carboxylic acid compound and the polyvalent metal compound, specifically, in the case of using a solution containing the unsaturated carboxylic acid compound and the polyvalent metal compound, as the method of producing the laminate film (I) constituting the packaging material for blood bags, it is preferable to add the polyvalent metal compound in an amount in excess of 0.3 chemical equivalent relative to the unsaturated carboxylic acid compound. In the case where a mixed solution in which the addition amount of the polyvalent metal compound is not more than 0.3 chemical equivalent is used, the resulting polymer layer may have a high free carboxylic acid group content, and, consequently, the resulting laminate may be low in gas barrier properties. The addition amount of the polyvalent metal compound does not have a particular upper limit. If the addition amount of the polyvalent metal compound exceeds 1 chemical equivalent, however, the amount of the polyvalent metal compound left unreacted would be increased. In view of this, the addition amount of the polyvalent metal compound is preferably not more than 5 chemical equivalents, more preferably not more than 2 chemical equivalents.

When a solution containing an unsaturated carboxylic acid compound and a polyvalent metal compound is used, ordinarily, the polyvalent metal salt of the unsaturated carboxylic acid compound is formed when the unsaturated carboxylic acid compound and the polyvalent metal compound are dissolved in a solvent. For assuring the formation of the polyvalent metal salt, however, the solution is preferably mixed for not less than one minute. Examples of the solvent used for preparation of the solution of the polyvalent metal salt of the unsaturated carboxylic acid compound include water, lower alcohols such as methyl alcohol, ethyl alcohol, isopropyl alcohol, etc., such organic solvents as acetone, methyl ethyl ketone, etc. and mixed solvents thereof, among which the preferred solvent is water.

As the method for coating the inorganic deposited layer (X) with the solution of the polyvalent metal salt of the unsaturated carboxylic acid compound or the method for coating ($Z_1$) with the solution of the polyvalent metal salt of the unsaturated carboxylic acid compound containing the vinyl alcohol based polymer (b), there can be used various known applying (coating) methods, such as a method of applying the solution to the surface of a surface to be coated, or a method of spraying the solution to the surface of a surface to be coated. As the method for coating the surface to be coated with the solution of the polyvalent metal salt of the unsaturated carboxylic acid compound or the like solution, the coating may be applied by use of any of various known coaters, for example, gravure coaters such as air knife coater, direct gravure coater, gravure offset coater, arc gravure coater, gravure reverse and jet nozzle systems, etc., reverse roll coaters, such as top feed reverse coater, bottom feed reverse coater, nozzle feed reverse coater, etc., five-roll coater, lip coater, bar coater, bar reverse coater, die coater, multilayer die coater, spray coater, dip coater, and so on. In the coating, the amount of the unsaturated carboxylic acid compound polyvalent metal salt in the solution (solid content) may be preferably 0.05 to 10 $g/m^2$, more preferably 0.1 to 5 $g/m^2$.

At the time of dissolving the polyvalent metal salt of the unsaturated carboxylic acid compound or at the time of dissolving the unsaturated carboxylic acid compound and the polyvalent metal compound, various substances may be added in such ranges as not to provide significant adverse effects. Examples of the various substances include: monomers or oligomers or low-molecular-weight compounds having an unsaturated double bond, e.g., acrylic acid bivalent esters of glycol such as methyl(meth)acrylate, ethyl(meth)acrylate, ethylene glycol di(meth)acrylate, diethylene glycol di(meth)acrylate, triethylene glycol di(meth)acrylate, PEG#200 di(meth)acrylate, PEG#400 di(meth)acrylate, PEG#600 di(meth)acrylate, neopentylglycol di(meth)acrylate, 1,4-butanediol di(meth)acrylate, etc., other unsaturated carboxylic acid (di)esters, vinyl ester compounds such as vinyl acetate, amide monomers such as acrylamide, etc.; and high-molecular-weight compounds such as polyvinyl alcohol, ethylene-vinyl alcohol copolymer, polyvinylpyrrolidone, polyvinyl ethyl ether, polyacrylamide, polyethyleneimine, starch, gum arabic, methyl cellulose and the like water-soluble polymers, acrylate polymers, ethylene-acrylic acid copolymer, polyvinyl acetate, ethylene-vinyl acetate copolymer, polyesters, polyurethane, etc. Cross-linking materials reactive with the monomers, polymers and the like may also be added.

At the time of dissolving the unsaturated carboxylic acid compound polyvalent metal salt or at the time of dissolving the unsaturated carboxylic acid compound and the polyvalent metal compound, various additives may be added in such ranges as not to provide significant adverse effects. Examples of the additives include lubricants, slip agents, anti-blocking agents, antistatic agents, anti-fogging agents, pigments, dyes, and inorganic or organic fillers. Further, for improving wettability with the inorganic deposited layer (X), various surfactants and the like may be preliminarily added.

For polymerization of the solution of the unsaturated carboxylic acid compound polyvalent metal salt and the like, there can be used various known methods, specific examples of which include methods based on irradiation with ionizing radiations or on heating. In the case of using ionizing radiation, there are no special restrictions insofar as the ionizing radiation is energy rays with a wavelength region in the range of 0.0001 to 800 nm. Examples of the energy rays include α-rays, β-rays, γ-rays, X-rays, visible rays, ultraviolet rays, and electron rays. Among these ionizing radiations, the visible rays with a wavelength region in the range of 400 to 800 nm, ultraviolet rays with a wavelength region in the range of 50 to 400 nm, and electron rays with a wavelength region in the range of 0.01 to 0.002 nm are preferred, since they are easy to handle and apparatuses therefor have been widespread.

In the case of using visible rays and ultraviolet rays as the ionizing radiation, it is necessary to add a photopolymerization initiator to the solution containing the unsaturated carboxylic acid compound polyvalent metal salt and the like. As the photopolymerization initiator, those which have been known can be used. Examples of the known photopolymerization initiators include radical polymerization initiators produced and sold under the respective trade names of, such as 2-hydroxy-2-methyl-1-phenyl-propan-1-one (trade name: Darocur 1173, produced by Ciba Specialty Chemicals Inc.), 1-hydroxy-cyclohexyl phenyl ketone (trade name: Irgacure 184, produced by Ciba Specialty Chemicals Inc.), bis(2,4,6-trimethylbenzoyl)-phenylphosphine oxide (trade name: Irgacure 819, produced by Ciba Specialty Chemicals Inc.), 1-[4-(2-hydroxyethoxy)-phenyl]-2-hydroxy-2-methyl-1-propan-1-one (trade name: Irgacure 2959, produced by Ciba Specialty Chemicals Inc.), α-hydroxyketones, acylphosphine oxides, a mixture of 4-methylbenzophenone and 2,4,6-trimethylbenzophenone (trade name: Esacure KT046, produced by Lamberti Chemical Specialties Co., Ltd.), Esacure KT55 (Lamberti Chemical Specialties Co., Ltd.), and 2,4,6-trimethylbenzoyldiphenylphosphine oxide (trade name: Speedcure TPO, Lambson Fine Chemicals Limited). Besides, a plurality of the initiators may be used. Further, initiators and polymerization aids of other types, such as peroxides and sensitizers, may also be used. Furthermore, polymerization accelerator for enhancing the polymerization degree and the rate of polymerization can be added, examples of which include N,N-dimethylamino-ethyl(meth)acrylate and N-(meth)acryloyl-morpholine.

At the time of polymerizing the unsaturated carboxylic acid compound polyvalent metal salt, the polymerization may be conducted while the solution of the salt contains a solvent such as water, or may be conducted after the solution of the salt is partly dried. In the case where the polymerization is effected immediately after coating with the solution, the resulting polymer layer may suffer blushing, possibly because the solvent is evaporated to a substantial extent at the time of polymerization of the metal salt. On the other hand, as the amount of the solvent (water) is reduced, the unsaturated carboxylic acid compound polyvalent metal salt may be precipitated as crystals. If the polymerization is conducted in such a condition, the formation of the resulting polymer layer may be insufficient, and the polymer layer may suffer blushing or the like, leading to instable gas barrier properties. In view of this, at the time of effecting polymerization of the unsaturated carboxylic acid compound polyvalent metal salt applied, it is preferable to effect the polymerization while the applied solution contains water in an appropriate quantity.

The temperature at which the unsaturated carboxylic acid compound polyvalent metal salt is irradiated with the ionizing radiation in the presence of the solvent is not particularly limited insofar as the temperature is not a temperature which causes boiling of the solvent. Ordinarily, however, the temperature is preferably not higher than 60° C., more preferably in the range from normal temperature to 50° C. If the temperature at which the irradiation with the ionizing radiation is conducted is too high, the solvent would be evaporated so rapidly that the unsaturated carboxylic acid compound polyvalent metal salt is susceptible to precipitation as crystals. If the temperature is too low, on the other hand, the period of time required for removing the solvent after polymerization of the unsaturated carboxylic acid compound polyvalent metal salt is prolonged, making it necessary for the gas barrier film production line or the like to be elongated.

Heat Treatment

The layers containing the unsaturated carboxylic acid compound polyvalent metal salt (layer ($Z_1$) and layer ($Z_2$)) can be further enhanced in gas barrier performance by subjecting them to a heat treatment. The heat treatment can be conducted by any of various heating methods, such as hot air heating, roll heating by a heating roll, or heating by use of heat rays such as infrared rays, near infrared rays, far infrared rays, etc.

The heat treatment of the gas barrier film is preferably conducted in a temperature range of 60 to 350° C., more preferably 100 to 300, and further preferably 150 to 250° C. More preferably, the heat treatment is carried out in an inert gas atmosphere. In addition, the pressure is not particularly limited; the heat treatment may be conducted under pressurization, at a reduced pressure, or at a normal pressure. While no problem is produced even if the heat treatment time is long, it is preferable that the heat treatment can be completed in a short time from the viewpoint of productivity. The heat treatment time is ordinarily about 0.01 second to 90 minutes, preferably 0.01 second to 70 minutes, and more preferably 0.01 second to 60 minutes.

Laminate Film (II)

The laminate film (II) constituting the packaging material for blood bags is a laminate film wherein at least two laminate films (I) each having the layer ($Z_2$) containing the polymer (a) of the unsaturated carboxylic acid compound polyvalent metal salt (A) and the vinyl alcohol based polymer (b) are laminated, with the layers ($Z_2$) of the laminate films (I) on the inside.

Lamination of the at least two laminate films (I) is conducted by a known laminating process, such as dry laminating, extrusion laminating, and thermal laminating. The lamination is preferably conducted using an adhesive. Examples of the adhesive to be used include various known adhesives of solvent type, aqueous type, solventless type or the like, such as urethane based adhesives and acrylic adhesives. Furthermore, three or more laminate films (I) may be laminated, as required. In that case, it suffices that the layers ($Z_2$) of the laminate films (I) are not set on the outside.

Reinforcement Layer

The reinforcement layer constituting the packaging material for blood bags can be made of various films of OPP (oriented polypropylene), CPP (cast polypropylene), EVOH ethylene vinyl alcohol polymer), PET, Ny, PE and the like, according to the performance requirements of the packaging material. Among these applicable films, biaxially oriented polyamide films are preferred, in consideration of the film strength, toughness and the like.

Heat Seal Layer

As the heat seal layer constituting the packaging material for blood bags, known heat seal layers may be used according to the performance requirements, shape and the like of the packaging material. The laminate film (II) with gas barrier properties has the heat seal layer laminated on top of at least one side thereof, whereby the laminate film (II) is obtained which is suitable as a heat-sealable packaging film. Such a heat seal layer is a layer obtained from various materials ordinarily known to form heat seal layers. Examples of the various materials include homopolymers or copolymers of α-olefins such as ethylene, propylene, butene-1, hexene-1,4-methylpentene-1, octene-1, etc.; compositions of one or a combination of two or more polyolefins such as high-pressure-produced low-density polyethylene, linear low-density polyethylene (so-called LLDPE), high-density polyethylene, polypropylene, polypropylene random copolymer, polybutene, poly-4-methylpentene-1, low crystalline or amorphous ethylene-propylene random copolymer, ethylene-butene-1 random copolymer, propylene butene-1 random copolymer, etc.; ethylene-vinyl acetate copolymer (EVA), ethylene-(meth)acrylic acid copolymer or metal salts thereof, and compositions of EVA and polyolefin. Among others, heat seal layers obtained by use of an ethylene based polymer such as high-pressure-produced low-density polyethylene, linear low-density polyethylene (so-called LLDPE), and high-density polyethylene are preferable because of their excellent low-temperature heat seal properties and heat seal strength.

The materials may be processed into a film in multiple layers to form a heat-sealable multilayer film, thereby using a film which has good balance of heat seal strength at the time of introducing the contents and easy-opening properties at the time of removing the contents, and which is suitable for such uses as packaging.

Method of Producing Packaging Material for Blood Bags

The packaging material for blood bags is produced by a method wherein a reinforcement layer and a heat seal layer are laminated on the surface of the base layer (Y) on one side of the laminate film (II) by use of any of known lamination processes, such as dry laminating, extrusion laminating, and thermal laminating. As the adhesive for use in the lamination, various known adhesives of solvent type, aqueous type, solventless type or the like can be used, examples of which include urethane based adhesives and acrylic adhesives.

Blood Bag Packaging

The blood bag packaging is a blood bag packaging formed by packaging a blood bag with the packaging material for blood bags described above. The blood bag packaging is preferably a packaging formed by a method wherein two sheets of the packaging material for blood bags are adhered to each other into the shape of a sack, a blood bag is accommodated in the sack, and the sack is sealed off. In addition, the blood bag packaging is preferably a blood bag packaging formed by a method wherein an upper portion of a vessel with a blood bag accommodated therein is heat sealed by use of the packaging material for blood bags. Further, the blood bag packaging is preferably composed of a plastic-made tray having been subjected to blister molding, and a top film formed by use of the packaging material for blood bags so as to cover the top side of the tray.

EXAMPLES

Exemplary aspects will be described more specifically below referring to Examples, but such exemplary aspects are not restricted to these examples. Physical property values and the like in Examples and Comparative Examples were determined by the following evaluation method.

Evaluation Method

Weight Loss [$g/m^2$]: A multilayer film was folded back so that the surface of a linear low-density polyethylene film or the surface of a non-oriented polypropylene film was on the inside, and two side edges were heat sealed to produce a sack-shaped body. Water was placed in the sack-shaped body, and the other one side edge of the sack-shaped body was heat sealed to produce a sack (three side seal bag) having a surface area of 0.01 $m^2$. The sack with water contained therein was left to stand under the conditions of 40° C. and 25% R.H. or below for 63 days, during when the loss in weight was measured after lapses of time (after one day, after 21 days, after 42 days, and after 63 days). The thus measured values were reduced to values per square meter ($m^2$).

Preparation of Solution (s1)

An aqueous zinc acrylate solution (s1) was prepared by mixing an aqueous zinc acrylate solution [produced by Asada Chemical Industry Co., Ltd.; concentration: 30 wt % (acrylic acid component: 20 wt %, zinc component: 10 wt %)] in an amount of 98.0 wt % in terms of solid content, a photopolymerization initiator [1-[4-(2-hydroxyethoxy)-phenyl]-2-hydroxy-2-methyl-1-propan-1-one] (trade name: Irgacure 2959; produced by Ciba Specialty Chemicals Inc.) diluted by 25 wt % with methyl alcohol in an amount of 1.3 wt % in terms of solid content, and a surfactant (trade name: Emulgen 120; produced by Kao Corporation) in an amount of 0.7 wt % in terms of solid content.

Preparation of Solution (s2)

A solution (s2) containing zinc acrylate and acrylate group-modified polyvinyl alcohol was prepared by admixing a mixed aqueous solution of zinc acrylate and an acrylate group-modified polyvinyl alcohol [concentration: 14 wt % (zinc acrylate component: 12 wt %, acrylate group-modified polyvinyl alcohol component: 2 wt %)] with the above mentioned zinc acrylate solution (s1), in such a manner that the amount of the zinc acrylate component was 88.5 wt % in terms of solid content, the amount of the acrylate group-modified polyvinyl alcohol component was 9.7 wt % in terms of solid content, the amount of the photopolymerization initiator was 1.2 wt % in terms of solid content, and the amount of the surfactant was 0.6 wt % in terms of solid content.

Example 1

A deposited surface of an aluminum oxide-deposited polyester film with a thickness of 12 μm was coated with the above-mentioned zinc acrylate solution (s1) by use of a bar coating process so that the coating amount was 0.5 $g/m^2$ in terms of solid content. The coated surface was immediately irradiated with UV rays under the conditions of an illuminance of 180 $mW/cm^2$ and an integrated light quantity of 180 $mJ/cm^2$ by use of a UV irradiation apparatus (EYE GRANDAGE Model ECS 301G1; produced by Eye Graphics Co., Ltd.), to effect polymerization and form a layer. Further, this layer was coated with the above-mentioned mixed solution (s2) of zinc acrylate and acrylate group-modified polyvinyl alcohol so that the coating amount was 3.0 $g/m^2$. The coating material was irradiated with UV rays under the same conditions as in coating with the zinc acrylate solution (s1) above, to effect polymerization and form a layer containing the modified polyvinyl alcohol. In this manner, a laminate film (I) was obtained wherein two layers, namely, the layer not containing the acrylate group-modified polyvinyl alcohol and the layer containing the acrylate group-modified polyvinyl alcohol were laminated.

Next, two sheets of the laminate film (I) were prepared. The surface of the modified polyvinyl alcohol-containing layer ($Z_2$) of one of the two sheets of laminate film (I) was coated with a polyurethane based dry laminate adhesive (trade name: Takelac A-310/Takenate A-3; produced by Mitsui Chemicals, Inc.). Then, the two sheets of laminate film (I) were laminated so that the coated surface of the one of the two sheets of laminate film (I) was in contact with the surface of the modified polyvinyl alcohol-containing layer ($Z_2$) of the other of the two sheets of laminate film (I). Further, the surface of the base layer (Y) was coated with the above-mentioned adhesive, and an LLDPE film as a heat seal layer with a thickness of 50 μm was laminated on the adhesive-coated surface. The thus obtained laminate film was evaluated by the above-mentioned method. The evaluation result of the weight loss is shown in Table 1.

Comparative Example 1

The surface of the modified polyvinyl alcohol-containing layer ($Z_2$) of one sheet of laminate film (I) was coated with a polyurethane based dry laminate adhesive (trade name: Takelac A-310/Takenate A-3; produced by Mitsui Chemicals, Inc.). On the adhesive-coated surface, an aluminum oxide-deposited polyester film with a thickness of 12 μm was laminated so that the deposited surface was in contact with the adhesive-coated surface. Further, the surface of the base layer (Y) of the laminate film (I) was coated with the above-mentioned adhesive. On this adhesive-coated surface, an LLDPE film as a heat seal layer with a thickness of 50 μm was laminated. The thus obtained laminate film was evaluated by the above-mentioned method. The evaluation result of the weight loss is shown in Table 1.

Comparative Example 2

The surface of the modified polyvinyl alcohol-containing layer ($Z_2$) of one sheet of the laminate film (I) was coated with a polyurethane based dry laminate adhesive (trade name: Takelac A-310/Takenate A-3; produced by Mitsui Chemicals, Inc.). On the adhesive-coated surface, an aluminum oxide-deposited polyester film with a thickness of 12 μm was laminated so that the deposited surface was in contact with the adhesive-coated surface. Further, the surface of the base layer of the aluminum oxide-deposited polyester film was coated with the above-mentioned adhesive, on which an LLDPE film as a heat seal layer with a thickness of 50 μm was laminated. The thus obtained laminate film was evaluated by the above-mentioned method. The evaluation result of the weight loss is shown in Table 1.

Comparative Example 3

The surface of the modified polyvinyl alcohol-containing layer ($Z_2$) of one sheet of laminate film (I) was coated with a polyurethane based dry laminate adhesive (trade name: Takelac A-310/Takenate A-3; produced by Mitsui Chemicals, Inc.). On the adhesive-coated surface, a 15 μm-thick nylon film (trade name: Emblem ON; produced by Unitika Ltd.) was laminated so that a corona-treated surface of the nylon film was in contact with the adhesive-coated surface. Further, the non-corona-treated surface of the nylon film was coated with the above-mentioned adhesive, on which an LLDPE film as a heat seal layer with a thickness of 50 μm was laminated.

The thus obtained laminate film was evaluated by the above-mentioned method. The evaluation result of the weight loss is shown in Table 1.

TABLE 1

| | | Weight loss [g/m²] | | | |
|---|---|---|---|---|---|
| Example | Configuration | One day after | 21 days after | 42 days after | 63 days after |
| Ex. 1 | (I)CS/CS(I)/(LLDPE) | 0.05 | 0.57 | 1.86 | 4.23 |
| Comp. Ex. 1 | (Deposited PET)DS/CS(I)/(LLDPE) | 0.02 | 1.81 | 4.26 | 7.08 |
| Comp. Ex. 2 | (I)CS/DS(Deposited PET)/(LLDPE) | 0.06 | 2.13 | 7.01 | 12.77 |
| Comp. Ex. 3 | (I)CS/(Emblem ON)/(LLDPE) | 0.04 | 4.13 | 21.11 | 46.02 |

CS: coated surface (adhesive-coated surface)
DS: deposited surface (aluminum oxide-deposited surface)

From Table 1, it is seen that in regard of the barrier films provided with the $Z_1$ layer and the $Z_2$ layer of the laminate film (I), the configuration wherein the $Z_2$ layer surfaces are adhered to each other (Example 1) shows a smaller weight loss with lapse of time and is more stable in barrier properties, as compared with the configurations wherein the laminate film (I) and the aluminum oxide-deposited polyester film are laminated (Comparative Examples 1 and 2) and the configuration wherein the laminate film (I) and the nylon film are laminated (Comparative Example 3).

Example 2

In the same manner as in Example 1, two sheets of laminate film (I) were prepared. The surface of the modified polyvinyl alcohol-containing layer ($Z_2$) of one of the two sheets of laminate film (I) was coated with a polyurethane based dry laminate adhesive (trade name: Takelac A-310/Takenate A-3; produced by Mitsui Chemicals, Inc.). On the adhesive-coated surface, the other sheet of laminate film (I) was laminated so that the surface of the modified polyvinyl alcohol-containing layer ($Z_2$) of the other sheet was in contact with the adhesive coated surface. Next, the surface of the base layer (Y) of the other sheet was coated with the above-mentioned adhesive, on which a biaxially oriented polyamide film as a reinforcement layer with a thickness of 15 μm was laminated. Next, the surface of the reinforcement layer was coated with the above-mentioned adhesive, on which an LLDPE film as a heat seal layer with a thickness of 50 μm was laminated. FIG. 2 shows a sectional schematic view of the thus obtained laminate film. The laminate film thus obtained was evaluated by the same method as in Example 1. It was confirmed that the laminate film obtained in Example 2 is stable in barrier performance, like the laminate film obtained in Example 1.

Example 3

In the same manner as in Example 2, two sheets of laminate film (I) were prepared. The surface of the modified polyvinyl alcohol-containing layer ($Z_2$) of one of the two sheets of laminate film (I) was coated with a polyurethane based dry laminate adhesive (trade name: Takelac A-310/Takenate A-3; produced by Mitsui Chemicals, Inc.). On the adhesive-coated film, the other sheet of laminate film (I) was laminated so that the surface of the modified polyvinyl alcohol-containing layer ($Z_2$) of the other sheet was in contact with the adhesive-coated surface. Further, the surface of the base layer (Y) of the sheet was coated with the above-mentioned adhesive, on which an LLDPE film as a heat seal layer with a thickness of 50 μm was laminated. Further, a biaxially oriented polyamide film as a reinforcement layer with a thickness of 15 μm was laminated on the surface of the base layer (Y) of the other sheet. FIG. 3 shows the thus obtained laminate film. The laminate film thus obtained was evaluated in the same manner as in Example 1. It was confirmed that the laminate film obtained in Example 3 is stable in barrier performance, like the laminate film obtained in Example 1.

The detailed description above describes a packaging material for blood bags and blood bag packaging obtained by packaging with packaging material for blood bags. The invention is not limited, however, to the precise embodiments and variations described. Various changes, modifications and equivalents could be effected by one skilled in the art without departing from the spirit and scope of the invention as defined in the appended claims. It is expressly intended that all such changes, modifications and equivalents which fall within the scope of the claims are embraced by the claims.

What is claimed is:

1. A packaging material for blood bags comprised of two laminate films (I), each laminate film (I) comprising a base layer, an inorganic deposited layer formed on top of the base layer, a layer containing a polymer of an unsaturated carboxylic acid compound polyvalent metal salt formed on top of the inorganic deposited layer, and a layer containing a polymer of an unsaturated carboxylic acid compound polyvalent metal salt and a vinyl alcohol based polymer formed on top of the layer containing a polymer of an unsaturated carboxylic acid compound polyvalent metal salt, wherein said two laminate films (I) are laminated by laminating the layers containing a polymer of an unsaturated carboxylic acid compound polyvalent metal salt and a vinyl alcohol based polymer to form a laminate film (II), and a heat seal layer is laminated on top of at least either one of the base layers of the laminate film (II).

2. The packaging material for blood bags according to claim 1, wherein a reinforcement layer and the heat seal layer are laminated in this order on top of at least one of the base layers.

3. The packaging material for blood bags according to claim 1, wherein a reinforcement layer is laminated on top of at least one of the base layers, and the heat seal layer is laminated on top of the other of the base layers.

4. The packaging material for blood bags according to claim 1, wherein the base layer is a biaxially oriented polyethylene terephthalate film.

5. The packaging material for blood bags according to claim 1, wherein the unsaturated carboxylic acid compound polyvalent metal salt is a salt of an unsaturated carboxylic acid compound having a polymerization degree of less than 20 with a polyvalent metal compound.

6. The packaging material for blood bags according to claim 1, wherein the unsaturated carboxylic acid compound polyvalent metal salt is a salt of acrylic acid with zinc.

7. The packaging material for blood bags according to claim 1, wherein the vinyl alcohol based polymer is a modified vinyl alcohol based polymer.

8. The packaging material for blood bags according to claim 2, wherein the reinforcement layer is a biaxially oriented polyamide film.

9. A blood bag packaging wherein a blood bag is packaged with the packaging material for blood bags according to claim 1.

10. A blood bag packaging wherein an upper surface of a vessel with a blood bag accommodated therein is heat sealed with the packaging material for blood bags according to claim 1.

* * * * *